(12) United States Patent
Lee et al.

(10) Patent No.: US 9,264,401 B2
(45) Date of Patent: Feb. 16, 2016

(54) NETWORK SYSTEM AND CONTROL METHOD THEREOF

(71) Applicant: SAMSUNG ELECTRONICS CO., LTD., Gyeonggi-do, Suwon-si (KR)

(72) Inventors: Dong Ik Lee, Seoul (KR); Dong Yun Hwang, Seoul (KR); Jai Ick Chun, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 36 days.

(21) Appl. No.: 14/313,389

(22) Filed: Jun. 24, 2014

(65) Prior Publication Data

US 2014/0310794 A1 Oct. 16, 2014

Related U.S. Application Data

(62) Division of application No. 13/403,688, filed on Feb. 23, 2012, now Pat. No. 8,792,507.

(30) Foreign Application Priority Data

Feb. 25, 2011 (KR) .................. 10-2011-0016900

(51) Int. Cl.
*H04L 29/06* (2006.01)
*H04L 12/28* (2006.01)
*H04L 29/12* (2006.01)

(52) U.S. Cl.
CPC ............ *H04L 63/02* (2013.01); *H04L 12/2834* (2013.01); *H04L 61/1511* (2013.01); *H04L 61/2076* (2013.01); *Y02B 70/325* (2013.01); *Y04S 20/228* (2013.01)

(58) Field of Classification Search
CPC ......... H04L 63/10; H04L 63/08; H04L 63/20; H04L 12/14; H04L 63/101; H04L 12/2818; H04L 61/1511; H04L 61/2007; H04L 12/1403; H04L 63/0236; H04W 12/08
USPC ..................................... 726/2, 3, 12
See application file for complete search history.

(56) References Cited

U.S. PATENT DOCUMENTS 7,451,234 B1 * 11/2008 Bonner ............ H04L 29/12066
709/220
2003/0196117 A1 * 10/2003 Kenmochi .............. G06F 21/31
726/6

(Continued)

OTHER PUBLICATIONS

Office Action mailed Jan. 14, 2014 in U.S. Appl. No. 13/403,688.

(Continued)

*Primary Examiner* — Jeffery Williams
*Assistant Examiner* — Christopher C Harris
(74) *Attorney, Agent, or Firm* — Staas & Halsey LLP

(57) ABSTRACT

Disclosed is a network system and a control method thereof, the network system including a gateway connected to a plurality of home appliances through a home area network, an outdoor apparatus connected to the gateway through a network, and a dynamic domain name system (DDNS) server to manage dynamic internet protocol (IP) address information about an apparatus using a dynamic IP address. A communication connection is achieved through a dynamic IP between a gateway inside the home and an apparatus outside the home in a smart grid network environment, so a user can easily access in-home services based on a dynamic IP. In addition, unauthorized traffic, which may be introduced into the home, is automatically blocked, so that the quality of the home network service is improved.

10 Claims, 9 Drawing Sheets

(56) References Cited

U.S. PATENT DOCUMENTS

| | | |
|---|---|---|
| 2007/0107019 A1 | 5/2007 | Romano et al. |
| 2008/0102854 A1 | 5/2008 | Yi et al. |
| 2008/0228944 A1 | 9/2008 | Lee et al. |
| 2008/0289009 A1* | 11/2008 | Lee .................. H04L 12/2818 726/4 |
| 2009/0094317 A1 | 4/2009 | Venkitaraman |
| 2010/0099382 A1 | 4/2010 | Ishiguro et al. |
| 2010/0107225 A1* | 4/2010 | Spencer ............ H04L 63/0876 726/4 |
| 2010/0217837 A1 | 8/2010 | Ansari et al. |
| 2012/0036233 A1 | 2/2012 | Scahill et al. |
| 2013/0208703 A1 | 8/2013 | Sugimoto et al. |

OTHER PUBLICATIONS

Notice of Allowance mailed Mar. 28, 2014 in U.S. Appl. No. 13/403,688.

U.S. Appl. No. 13/403,688, filed Feb. 23, 2012, Dong Ik Lee, Samsung Electronics Co., Ltd.

* cited by examiner

| No | IP ADDRESS | URL |
|---|---|---|
| 1 | 210.103.60.1 | http://outdoor.com |
| 2 | 168.203.100.3 | http://indoor.com |
| ⋮ | ⋮ | ⋮ |

| No | IP ADDRESS | URL |
|----|------------|-----|
| 1 | 168.203.100.3 | http://indoor.com |
| 2 | 203.100.80.1 | http://indoor.com |
| ⋮ | ⋮ | ⋮ |

| No | IP ADDRESS | URL |
|---|---|---|
| 1 | 210.103.60.1 | http://outdoor.com |
| 2 | 218.111.10.1 | http://outdoor.com |
| ⋮ | ⋮ | ⋮ |

| No | IP ADDRESS | URL |
|---|---|---|
| 1 | 210.103.60.1 | http://outdoor.com |
| 2 | 218.111.10.1 | http://outdoor.com |
| ⋮ | ⋮ | ⋮ |

| No | IP ADDRESS | URL |
|----|------------|-----|
| 1 | 168.203.100.3 | http://indoor.com |
| 2 | 203.100.80.1 | http://indoor.com |
| ⋮ | ⋮ | ⋮ |

NETWORK SYSTEM AND CONTROL METHOD THEREOF

CROSS-REFERENCE TO RELATED APPLICATIONS

This application is a divisional of U.S. patent application Ser. No. 13/403,688, filed on Feb. 23, 2012, which is currently pending, and claims the benefit of Korean Patent Application No. 10-2011-0016900, filed on Feb. 25, 2011 in the Korean Intellectual Property Office, the disclosures of each of which are incorporated herein by reference.

BACKGROUND

1. Field

Embodiments of the present disclosure relate to a network system and a control method thereof, and more particularly, to a network system performing a communication with an apparatus inside a home and a control method thereof.

2. Description of the Related Art

A smart grid has an architecture allowing bidirectional information exchange between energy-related nodes: such as power generation nodes, power transmission nodes, power distribution nodes, and sales nodes. In exchanging information between the energy-related nodes, a Home Area Network (HAN) inside a home accesses a device outside the home through a network regardless of place and time. However, such an access increases the chance that the HAN is attacked by an unauthorized or intended external threat, such as a virus and/or hacking.

In a conventional smart grid network environment, the connection between the HAN and a device outside the home is achieved based on a fixed internet protocol (IP). Accordingly, a dynamic IP connection is regarded as unauthorized traffic needing to be blocked, or has difficulty in establishing a connection.

In addition, even if a connection based on a dynamic IP is established, the connection, which does not employ a fixed IP, cannot use an IP-based access permission policy, and thus services are easily attacked and/or invaded by external forces.

In particular, for the dynamic IP based connection, if a target device—which is to be connected—changes its IP through returning or updating IP, the device making a request has difficulty in obtaining the IP of the target device in real time, thus failing to establish a connection.

In general, a smart grid, which claims to support an open network, has to protect information inside the HAN from an external network, and is also used to block unauthorized traffic. In addition, if a gateway serving as an entry point to the HAN is connected to a device outside the home through a dynamic IP allocation, a communication service is not provided.

According to a conventional smart grid HAN that mainly uses a dynamic IP allocation (when a connection is made from an external open type network to a HAN), a remote terminal experiences difficulty in accessing a gateway inside the home. There is a need for enhancing the efficiency of a connection from a device inside the home to a device outside the home, or vice versa, through a dynamic IP allocation using a dynamic IP.

SUMMARY

Therefore, it is an aspect of the present disclosure to provide a network system capable of achieving a connection between a gateway connected to an appliance inside a home through a Home Area Network (HAN) and an apparatus outside the home through a dynamic IP in a smart grid network environment, and a control method thereof.

Additional aspects of the invention will be set forth in part in the description which follows and, in part, will be obvious from the description, or may be learned by practice of the invention.

In accordance with one aspect of the present invention, a network system includes a gateway, an outdoor apparatus, a dynamic domain name system (DDNS) and server. The gateway is connected to a plurality of home appliances through a home area network in a home. The outdoor apparatus is connected to the gateway through a network and uses a dynamic internet protocol (IP) address. The DDNS server is connected to the outdoor apparatus and the gateway through a network, and is configured to manage dynamic IP address information about the outdoor apparatus, and upon a request made by the gateway, provides the gateway with dynamic IP address information about the outdoor apparatus. If the outdoor apparatus makes a request for connection, the gateway requests the DDNS server to provide IP address information about the outdoor apparatus having requested the connection, receives the requested IP address information and permits or blocks the connection of the outdoor apparatus depending on whether the received IP address information is matched to IP address information about the outdoor apparatus having requested the connection.

In order for the outdoor apparatus to request a connection to the gateway, the outdoor apparatus requests the DDNS server to provide an IP address corresponding to a domain name of the gateway, receives the requested IP address and accesses the received IP address, thereby requesting the connection to the gateway.

The gateway stores a lookup table having an access control list that stores URL information about the outdoor apparatus, which is permitted connection, and IP address information corresponding to the URL information, and the gateway receives the IP address information about the outdoor apparatus having requested the connection and updates the access control list of the lookup table by use of the received IP address information.

The DDNS server receives a changed IP address of the outdoor apparatus from an internet service provider (ISP) service provider that is connected to the DDNS server through a network, and manages IP address information about the outdoor apparatus.

In accordance with another aspect of the present invention, a network system includes a gateway, an outdoor apparatus, and a dynamic domain name system (DDNS) server. The gateway is connected to a plurality of home appliances through a HAN in a home and uses a dynamic IP address. The outdoor apparatus is connected to the gateway through a network. The DDNS server is connected to the outdoor apparatus and the gateway through a network and is configured to manage dynamic IP address information about the gateway, and upon a request made by the outdoor apparatus, provides the outdoor apparatus with dynamic IP address information about the gateway. If the gateway makes a request for connection, the outdoor apparatus requests the DDNS server to provide IP address information about the gateway having requested the connection, receives the requested IP address information and permits or blocks the connection of the gateway depending on whether the received IP address information is matched to IP address information about the gateway having requested the connection.

In order for the gateway to request a connection to the outdoor apparatus, the gateway requests the DDNS server to provide an IP address corresponding to a domain name of the outdoor apparatus, receives the requested IP address and accesses the received IP address, thereby requesting the connection to the outdoor apparatus.

The outdoor apparatus stores a lookup table having an access control list that stores URL information about the gateway, which is permitted connection, and IP address information corresponding to the URL information, and the outdoor apparatus receives the IP address information about the gateway having requested the connection and updates the access control list of the lookup table by use of the received IP address information.

The DDNS server receives a changed IP address of the gateway from an internet service provider (ISP) service provider that is connected to the DDNS server through a network, and manages IP address information about the gateway.

In accordance with another aspect of the present invention, a control method is disclosed which relates to a network system including a gateway connected to a plurality of home appliances through a home area network in a home, an outdoor apparatus connected to the gateway through a network and using a dynamic internet protocol (IP) address, and a dynamic domain name system (DDNS) server connected to the outdoor apparatus and the gateway through a network and configured to manage dynamic IP address information of the outdoor apparatus, and upon a request made by the gateway, provides the gateway with dynamic IP address information about the outdoor apparatus. The control method may be described as follows. The outdoor apparatus makes a request for connection to the gateway. The gateway accesses the DDNS server to request the DDNS server to provide IP address information about the outdoor apparatus having requested the connection. The DDNS server, in response to the request by the gateway, provides the gateway with IP address information about the outdoor apparatus having requested the connection. The gateway receives the requested IP address information about the outdoor apparatus from the DDSN server. The gateway determines whether the received IP address information is matched to IP address information about the outdoor apparatus having requested the connection. The gateway permits or blocks the connection of the outdoor apparatus based on a result of the determination.

In the requesting for the IP address information about the outdoor apparatus from the DDNS server, the gateway requests the DDNS server to provide a dynamic IP address corresponding to a domain name of the outdoor apparatus having requested the connection.

In accordance with another aspect of the present invention, a control method is disclosed which relates to a network system including a gateway connected to a plurality of home appliances through a home area network in a home and using a dynamic IP address, an outdoor apparatus connected to the gateway through a network, and a dynamic domain name system (DDNS) server connected to the outdoor apparatus and the gateway through a network and configured to manage dynamic IP address information about the gateway, and upon a request made by the outdoor apparatus, provides the outdoor apparatus with dynamic IP address information about the gateway. The control method may be described as follows. The gateway makes a request for connection to the outdoor apparatus. The outdoor apparatus accesses the DDNS server to request the DDNS server to provide IP address information about the gateway having requested the connection. The DDNS server, in response to the request by the outdoor apparatus, provides the outdoor apparatus with IP address information about the gateway having requested the connection. The outdoor apparatus receives the requested IP address information about the gateway from the DDSN server. The outdoor apparatus determines whether the received IP address information is matched to IP address information about the gateway having requested the connection. The outdoor apparatus permits or blocks the connection of the gateway based on a result of the determination.

In the requesting for the IP address information about the gateway from the DDNS server, the outdoor apparatus requests the DDNS server to provide a dynamic IP address corresponding to a domain name of the gateway having requested the connection.

In accordance with another aspect of the present invention, a control method of a network system comprising a gateway connected to a plurality of home appliances through a home area network in home, an outdoor apparatus connected to the gateway through a network and using a dynamic internet protocol (IP) address, and a dynamic domain name system (DDNS) server connected to the outdoor apparatus and the gateway through a network and configured to manage dynamic IP address information of the outdoor apparatus, and upon a request made by the gateway, provide the gateway with dynamic IP address information about the outdoor apparatus, the control method is as follows. If the outdoor apparatus makes a request for connection, the gateway requests the DDNS server to provide IP address information about the outdoor apparatus having requested the connection and receiving the requested IP address. The gateway determines whether the received IP address information is matched to IP address information that is directly received from the outdoor apparatus having requested the connection. The connection of the outdoor apparatus is permitted if a result of the determination is that the IP address information received from the DDNS server is matched to the IP address information directly received from the outdoor apparatus, and blocking the connection of the outdoor apparatus if a result of the determination is that the IP address information received from the DDNS server is not matched to the IP address information directly received from the outdoor apparatus.

In accordance with another aspect of the present invention, a control method is disclosed which relates to a network system including a gateway connected to a plurality of home appliances through a home area network in a home and using a dynamic IP address, an outdoor apparatus connected to the gateway through a network, and a dynamic domain name system (DDNS) server connected to the outdoor apparatus and the gateway through a network and configured to manage dynamic IP address information about the gateway, and upon a request made by the outdoor apparatus, provides the outdoor apparatus with dynamic IP address information about the gateway. The control method may be described as follows. If the gateway makes a request for connection, the outdoor apparatus requests the DDNS server to provide IP address information about the gateway having requested the connection and receiving the requested IP address. The outdoor apparatus determines whether the received IP address information is matched to IP address information that is directly received from the gateway having requested the connection. The connection of the gateway is permitted if a result of the determination is that the IP address information received from the DDNS server is matched to the IP address information directly received from the gateway, and blocking the connection of the gateway if a result of the determination is that the IP address information received from the DDNS server is not matched to the IP address information directly received from the gateway.

As described above, a communication connection is achieved through a dynamic IP between an apparatus inside a home and an apparatus outside a home in a smart grid network environment. Accordingly, a user can easily access in-home services based on a dynamic IP. In addition, unauthorized traffic, which is introduced into the home, is automatically blocked, so that the quality of home network service is improved.

BRIEF DESCRIPTION OF THE DRAWINGS

These and/or other aspects of the disclosure will become apparent, and more readily appreciated from the following description of the embodiments, taken in conjunction with the accompanying drawings of which:

FIG. 3 is a table illustrating an example of IP address information and URL information of each of the gateway and the outdoor apparatus in the DDNS server of the network system.

FIG. 5 is a diagram used to explain an example of IP address information and URL information about a gateway to which the outdoor apparatus of FIG. 4 accesses.

FIG. 6 is a diagram used to explain an example of IP address information and URL information about an outdoor apparatus allowed for connection to the gateway of FIG. 4.

FIG. 8 is a diagram used to explain an example of IP address information and URL information about an outdoor apparatus to which the gateway of FIG. 7 accesses.

FIG. 9 is a diagram used to explain an example of IP address information and URL information about a gateway allowed for connection to the outdoor apparatus of FIG. 7.

DETAILED DESCRIPTION

Figure 1:
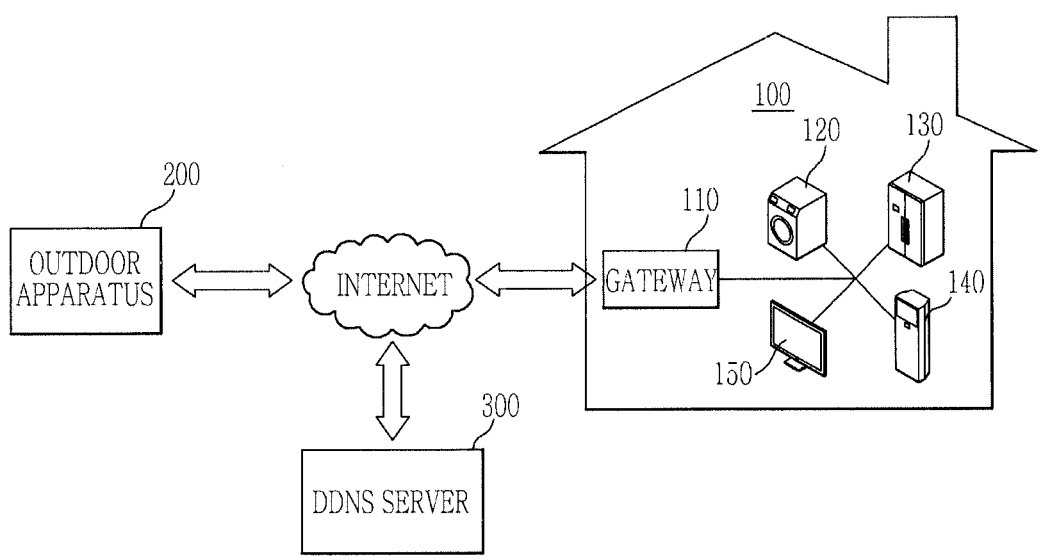
FIG. 1 is a diagram illustrating an example of a network system.

Reference will now be made in detail to the embodiments of the present disclosure, examples of which are illustrated in the accompanying drawings, wherein like reference numerals refer to like elements throughout.

FIG. 1 is a diagram illustrating an example of a network system.

Referring to FIG. 1, a network system includes a home area network (HAN) 100, an outdoor apparatus 200 and a dynamic domain name system (DDNS) server 300.

The HAN 100, the outside apparatus 200 and the DDNS server 300 are connected among one another through a network such as the Internet.

The HAN 100 includes a plurality of home appliances 120, 130 140, and 150 provided inside home and a gateway 110 connected to the plurality of home appliances 120, 130, 140, and 150 through a network backbone that is constructed inside home. In this configuration, the plurality of home appliances 120, 130, 140, and 150 are connected to an external network, such as the Internet, through the gateway 110.

The plurality of home appliances 120, 130, 140, and 150 (for example, a washing machine 120, a refrigerator 130, an air-conditioner 140, and a television 150) is connected to the outdoor or external apparatus 200 through the Internet via the gateway 110 such that the plurality of home appliances 120, 130, 140, and 150 is communicable with the outdoor apparatus 200. The home appliances 120, 130, 140, and 150 are connected to the gateway 110 through a network in the same scheme as that of a general URL connection scheme for the gateway 110.

The gateway 110 is configured such that the home appliances 120, 130, 140, and 150 inside the home may exchange information with the outdoor apparatus 200 based on internet protocol (IP) addresses. For example, the gateway 110 may serve to provide the outdoor apparatus 200 with power information about the washing machine 120 among the home appliances 120, 130, 140 and 150, connect the outdoor apparatus 200, which desires to connect to the washing machine 120 or desires to receive power information about the washing machine 120, to the washing machine 120, or provide the outdoor apparatus with the power information.

In addition, the gateway 110 is configured such that the home appliances 120, 130, 140, and 150 share contents provided from the home appliances 120, 130, 140, and 150. For example, the gateway 110 allows power information about the refrigerator 130 to be shared among other home appliances 120, 140, and 150, so that a user may operate the home appliances 120, 130, 140, and 150 in consideration of the power condition of the refrigerator 130.

The gateway 110 is allocated a dynamic IP address through an internet service provider (ISP) whenever the gateway 110 is booted.

Each of the gateway 110 and the outdoor apparatus 200 builds up an access control list lookup table, and stores it in a built-in storage unit. The access control list lookup table stored may be set to be automatically updated whenever a connection is established. The access control list lookup table is necessarily set to provide IP address and URL in setting category. The DDNS server 300 provides a DDNS service such that a domain name system, which is available for service with a fixed IP domain name, is available for service even with a dynamic IP domain name.

The DDNS enables an apparatus, which mainly uses dynamic IP addresses, to easily maintain DNS information. In general, if an apparatus accesses the Internet, the ISP selects one of a plurality of IP addresses, which are not currently used, and allocates the selected IP address to the apparatus. The IP address is exclusively used only while the apparatus is gaining access to the Internet. In this allocation scheme, more apparatuses are supported using a smaller number of IP addresses, compared to a fixed allocation scheme of allocating a fixed IP address to an individual apparatus. For an apparatus, which registers its own domain name and IP address in the DNS and uses the domain name and IP address, the IP address is changed at each connection and increases inconveniences due to the frequently changing IP addresses. However, the DDNS server 300 automatically updates a DNS database whenever an IP address is allocated from the ISP. Accordingly, even if an IP address corresponding to a predetermined domain name is frequently changed, a domain name may be recognized from a new IP address. Therefore, an access based on a dynamic IP address is achieved while ensuring security.

The outdoor apparatus 200 represents an apparatus that is connectable to the Internet, for example, a computer, a power management monitoring apparatus, and/or a portable terminal apparatus.

The outdoor apparatus 200 may be connected to the gateway 110 of the HAN 100 via the Internet, or be connected to the plurality of home appliances 120, 130, 140, and 150 through the gateway 110. Accordingly, a user may control the plurality of home appliances 120, 130, 140, and 150, and monitor the statuses of the home appliances 120, 130, 140, and 150 by use of the outdoor apparatus 200.

In the network system having the above configuration, a communication connection between the outside apparatus 200 and the gateway 110 is approved or refused by use of an access control list configuration and automatic update function of each of the outdoor apparatus 200 and the gateway 110, and by use of an IP address access blocking function through an access control list. Each of the outside apparatus 200 and the gateway 110 stores domain name queries and access information with respect to the DDNS server 300.

For example, if the outdoor apparatus 200 makes a request for connection to the gateway 110 of the HAN 100 in the network system, and the gateway 110 receives IP address information from the outdoor apparatus 200, the gateway 110 requests the DDNS server 300 to provide URL information, which corresponds to the received IP address information, and receives the requested URL information. If the received URL is a registered URL, the gateway 110 approves the request for the outdoor apparatus 200 to make a communication connection to the HAN 100. If the received URL is not a registered URL, the gateway 100 denies the request for the outdoor apparatus 200 to make a communication connection to the HAN 100.

In addition, if the gateway 110 of the HAN 100 makes a request for connection to the outdoor apparatus 200 in the network system, and the outdoor apparatus 200 receives IP address information from the gateway 110, the outdoor apparatus 200 requests the DDNS server 300 to provide URL information, which corresponds to the received IP address information upon request, and receives the requested URL information. If the received URL is a registered URL, the outdoor apparatus 200 approves the request for the HAN 100 to make a communication connection to the outdoor apparatus 200. If the received URL is not a registered URL, the outdoor apparatus 200 denies the request for the HAN 100 to make a communication connection to the outdoor apparatus 200.

Figure 2:
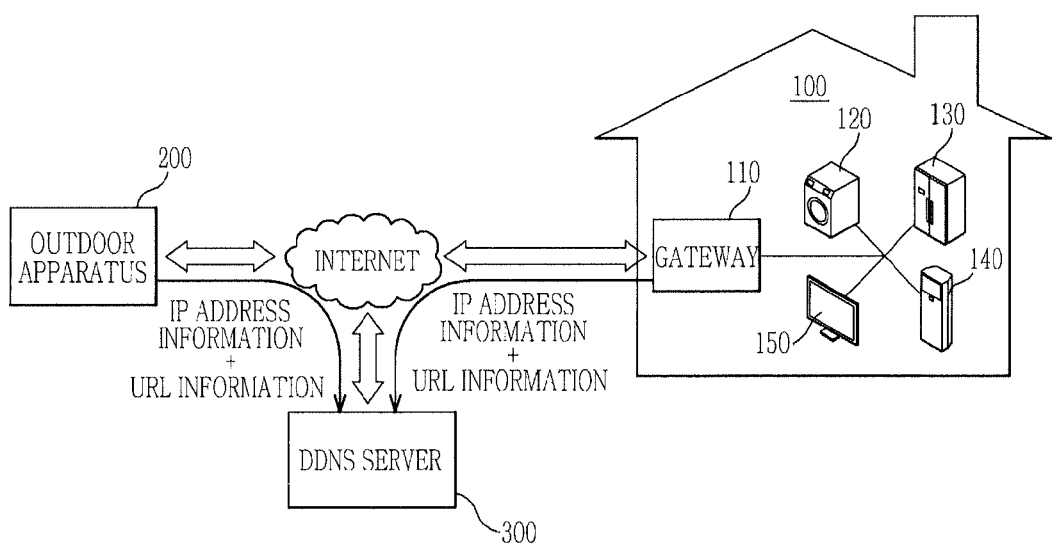
FIG. 2 is a diagram used to explain an example in which a gateway of a home area network (HAN) and an outdoor apparatus register URL information and internet protocol (IP) address information in a dynamic domain name system (DDNS) server of the network system.

FIG. 2 is a diagram used to explain an example in which a gateway and an outdoor apparatus registers URL information and internet protocol (IP) address information in a dynamic domain name system (DDNS) server of the network system. FIG. 3 is a table illustrating an example of IP address information and URL information of the gateway and the outdoor apparatus in the DDNS server of the network system.

Referring to FIG. 2, the gateway 110 of the HAN 100 and the outdoor apparatus 200 are registered in the DDNS server 300. When the gateway 110 and the outdoor apparatus 200 are registered in the DDNS server 300, URL information and IP address of each of the gateway 110 and the outdoor apparatus 200 are stored in the DDNS server 300. In this case, the gateway 110 and the outdoor 200 register their own URL information and IP address information in the DDNS server 300 by accessing the DDNS server 300 through the Internet and by using the queries with respect to the DDNS server 300.

Whenever IP addresses of the gateway 110 and the outdoor apparatus 200 registered in the DDNS server 300 are changed, the gateway 110 and the outdoor apparatus 200 notify the changed IP address information to the DDNS server 300. The gateway 110 and the outdoor apparatus 200 gain access to the DDS server 300 by use of their own identification information and password, and periodically update their own IP address information.

Referring to FIG. 3, a storage unit of the DDNS server 300 stores URL addresses and IP address information about the registered gateway 100 and the outside apparatus 200.

For example, if an IP address of the gateway 110 and a URL of the gateway 110 are "210.103.60.1" and "http://outdoor.com," respectively, the IP address "210.103.60.1" and the URL "http://outdoor.com" of the gateway 110 are stored to correspond to each other in the storage of the DDNS server 300. In addition, if an IP address of the outdoor apparatus 200 and a URL of the outdoor apparatus 200 are "168.203.100.3" and "http://indoor.com," respectively, the IP address "168.203.100.3" and the URL http://indoor.com of the outdoor apparatus 200 are stored to correspond to each other in the storage of the DDNS server 300.

Meanwhile, if the outdoor apparatus 200 uses a fixed IP address and the gateway 110 uses a dynamic IP address, the DDNS server 300 may store URL information and IP address information about the gateway 110 only. In this case, the URL information "http://outdoor.com" about the gateway 110 and the IP address information "210.103.60.1" about the gateway 110 are stored to correspond to each other in the storage unit of the DDSN server 300.

In contrast, if the gateway 110 uses a fixed IP address and the outdoor apparatus 200 uses a dynamic IP address, the DDNS server 300 may store URL information and IP address information about the outdoor apparatus 200 only. In this case, the URL information "http://indoor.com" about the outdoor apparatus 200 and the IP address information "168.203.100.3" about the outdoor apparatus 200 are stored to correspond to each other in the storage unit of the DDSN server 300.

Hereinafter, the description will be made in relation to the outdoor apparatus 200 using a fixed IP address to make a request for connection to the gateway 110 of the HAN 100 in the example network system, and the gateway 110 approves or refuses the communication connection of the outdoor apparatus 200.

Figure 4:
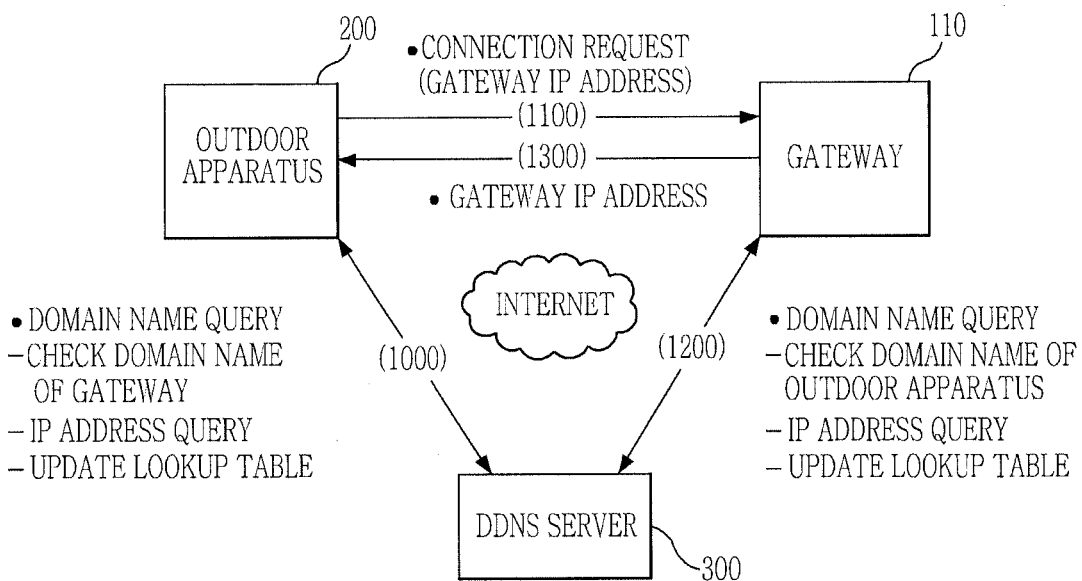
FIG. 4 is a diagram illustrating an example in which the outdoor apparatus using a dynamic IP address establishes a communication connection to the gateway of the HAN in the network system.

FIG. 4 is a diagram illustrating an example in which the outdoor apparatus using a dynamic IP address establishes a communication connection to the gateway of the HAN in the network system. FIG. 5 is a diagram used to explain an example in which IP address information and URL information about the outdoor apparatus are updated in the gateway. FIG. 6 is a diagram used to explain an example in which IP address information and URL information about the gateway are updated in the outdoor apparatus.

Referring to FIG. 4, in order for the outdoor apparatus 200 to gain access to the gateway 110 of the HAN 100, the outdoor apparatus 200 needs to know URL information and IP address information about the gateway 110 in advance.

Accordingly, there is a need to update an access control list, which stores URL information and IP address information about the gateway 110, in a lookup table stored in a storage of the outdoor apparatus 200. The access control list is updated by performing a domain name query with respect to the DDNS server 300.

Referring to FIG. 5, the access control list lookup table stores URL information and IP address information about the gateway 110 to which the outdoor apparatus is connected.

For example, the gateway 110 has a domain name "indoor.com," and changed IP addresses are stored in a chronological order. For example, "168.203.100.3" is a previous IP address having been allocated when the gateway 110 has been booted in the past; and "203.100.80.1" is a current IP address allocated when the gateway 110 is booted at the present.

Referring again to FIG. 4, the outdoor apparatus 200 performs a domain name query with respect to the DDNS server 300 (1000), thereby checking a domain name of the gateway 110 desired for connection, collecting IP addresses and updating the IP address information in the access control list of the lookup table stored in the storage of the outdoor apparatus 200 by use of the collected IP addresses.

The outdoor apparatus 200 performs a domain name query with respect to the DDNS server 300 such that the domain name of the desired gateway 110 is checked, the IP addresses are collected, and the access control list is updated; and then makes a request for connection to the IP address corresponding to the checked domain name of the gateway 110 (1100).

The gateway 110 requested by the outdoor apparatus 200 for connection performs a domain name query with respect to the DDNS server 300 to update the access control list of the lookup table stored in the storage of the gateway 100 (1200). That is, the gateway 110 obtains IP address information from DDNS server 300 based on URL information of the access control list through the DDNS query with respect to the DDNS server 300, and updates the access control list by use of the obtained IP address information. In this case, the gateway 110 requested by the outdoor apparatus 200 for connection checks a domain name by analyzing URL information of the access control list of the lookup table, collects an IP address corresponding to the checked domain name from the DDNS server 300, and updates relevant IP information in the access control list of the lookup tab by use of the collected IP address.

For example, if the access control list of the lookup table stored in the storage unit of the gateway 110 stores a plurality of pieces of URL information and a plurality of pieces of IP address information about a plurality of outdoor apparatuses, the gateway 110 collects IP addresses of all of the outdoor apparatuses having domain names included in the plurality of pieces of URL information about the outdoor apparatuses stored in the access control list, and updates the access control list by use of the collected IP addresses.

Meanwhile, the gateway 110 requested by the outdoor apparatus 200 for connection may collect an IP address, which corresponds to a domain name of the outdoor apparatus 200 having requested the connection, from the DDNS server 300, and updates an IP address, which corresponds to URL information having the domain name of the outdoor apparatus 200 having requested connection, in the access control list of the lookup table by use of the collected IP address.

Referring to FIG. 6, the access control list lookup table stores URL information about the outdoor apparatus 200, which is approved for connection to the gateway 110, and stores changed IP address information in a chronological order.

For example, the outdoor apparatus 200 connectable to the gateway 110 has a domain name "outdoor.com", and "210.103.60.1" and "218.111.10.1" represent IP addresses having been allowed when the outdoor apparatus 200 has gained access to the gateway 110. The respective IP addresses "210.103.60.1" and "218.111.10.1" have been assigned at the booting of the outdoor apparatus 200. The IP address "218.111.10.1" has been assigned more recently than the IP address "210.103.60.1".

Meanwhile, after the access control list is updated, the gateway 110 determines whether an IP address of the outdoor apparatus 200 having requested the connection is matched to an IP address of the outdoor apparatus 200 in the access control list of the lookup table. If the gateway 110 finds an IP address matched to the IP address of the outdoor apparatus 200 having requested the connection in the lookup table access control list, the gateway 110 approves the connection of the outdoor apparatus 200. If the gateway 110 fails to find an IP address matched to the IP address of the outdoor apparatus 200 having requested the connection, the gateway 110 denies the connection of the outdoor apparatus 200 (1300).

That is, the outdoor apparatus 200 using a dynamic IP address knows URL information about the gateway 110, which is desired for connection, through the access control list lookup table, and then collects IP address information about the gateway 110 by performing a domain name query with respect to the DDNS server 300. The outdoor apparatus 200 attempts to gain access to the HAN 100 by use of the collected IP address information to connect to the gateway 110. That is, the outdoor apparatus 110 transmits an outdoor apparatus query including its own identification information to the DDNS server 300 to receive IP address information about the gateway 110, which is desired for connection, from the DDNS server 300. Thereafter, the outdoor apparatus 200 makes a request for connection to the gateway 110 by use of IP address information about the gateway 110.

Meanwhile, the gateway 110, having been requested by the outdoor apparatus 200 for the connection, performs a domain name query with respect to the DDNS server 300 by use of URL information in the access control list to collect IP address information about the outdoor apparatus 200 having requested the connection. That is, the gateway 110 transmits a gateway query including its identification information to the DDNS server 300 to receive IP address information about the outdoor apparatus 200, which has requested the connection, from the DDNS server 300, and updates the access control list by use of the received IP information. In the case that a query is generated from the gateway 110, and that if the outdoor apparatus 200 corresponding to the generated query is registered in the database and is in an active state, the DDNS server 300 notifies the gateway 110 of the IP address about the outdoor apparatus 200 registered in the database in response to the query.

Upon notification of the IP address about the outdoor apparatus 200 having requested the connection from the DDNS server 300, the gateway 110 updates the access control list by use of the notified IP address.

After updating of the access control list, the gateway 110 determines whether an IP address corresponding to a domain name of the outdoor apparatus 200 (having requested the connection) is matched to an IP address in the access control list. If the corresponding IP address is found, the gateway 110 approves the connection of the outdoor apparatus 200. If the corresponding IP address is not found, the gateway 110 denies the connection of the outdoor apparatus 200.

Hereinafter, a description will be made in relation to the gateway 110 using a fixed IP address to make a request for connection to the outdoor apparatus 200, and the outdoor apparatus 200 approves or refuses the communication connection of the gateway 110.

Figure 7:
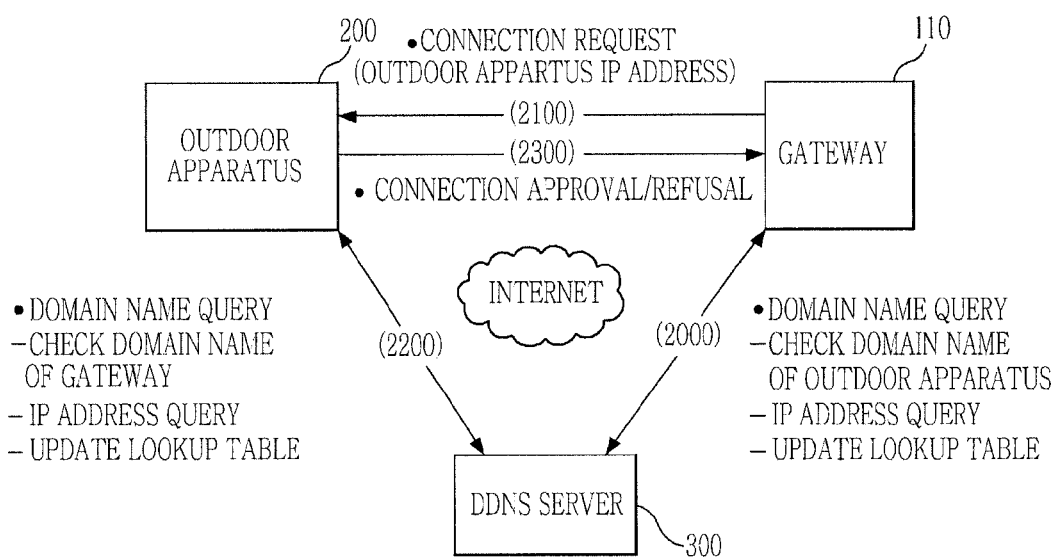
FIG. 7 is a diagram illustrating an example in which the HAN makes a connection to the outdoor apparatus in the network system.

FIG. 7 is a diagram illustrating an example in which the HAN establishes a communication connection to the outdoor apparatus in the network system. FIG. 8 is a diagram used to explain an example of IP address information and URL information about an outdoor apparatus to which the gateway of FIG. 7 accesses. FIG. 9 is a diagram used to explain an example of IP address information and URL information about a gateway which is allowed to be connected to the outdoor apparatus of FIG. 7.

Referring to FIG. 7, in order for the gateway 110 of the HAN 100 to gain access to the outdoor apparatus 200, the gateway 110 needs to know URL information and IP address information about the outdoor apparatus 200 in advance.

Accordingly, there is a need to update an access control list, which stores URL information and IP address information about the outdoor apparatus 200, in a lookup table stored in a storage of the gateway 110. The access control list is updated by performing a domain name query with respect to the DDNS server 300.

Referring to FIG. 8, the access control list lookup table stores URL information and IP address information about the outdoor apparatus 200 to which the gateway 110 is connected.

For example, the outdoor apparatus 200 has a domain name "outdoor.com," and changed IP addresses are stored in a chronological order. That is, "210.103.60.1" is a previous IP address having been allocated when the outdoor apparatus 200 has been booted in the past, and "218.111.10.1" is a current IP address allocated when the outdoor apparatus 200 is booted at the present.

Referring again to FIG. 7, the gateway 110 performs a domain name query with respect to the DDNS server 300 (2000), thereby checking a domain name of the outdoor apparatus 200 desired for connection, collecting IP addresses, and updating the IP address information in the access control list of the lookup table stored in the storage of the gateway 110 by use of the collected IP addresses.

The gateway 110 performs a domain name query with respect to the DDNS server 300 such that the domain name of the desired outdoor apparatus 200 is checked, the IP addresses are collected and the access control list is updated; and then makes a request for connection to the IP address corresponding to the checked domain name of the outdoor apparatus 200 (2100).

The outdoor apparatus 200 requested by the gateway 100 for connection performs a domain name query with respect to the DDNS server 300 to update the access control list of the lookup table stored in the storage of the outdoor apparatus 200 (2200). That is, the outdoor apparatus 200 obtains IP address information from DDNS server 300 based on URL information of the access control list through the DDNS query with respect to the DDNS server 300, and updates the access control list by use of the obtained IP address information. In this case, the outdoor apparatus 200 requested by the gateway 110 for connection checks a domain name by analyzing URL information of the access control list of the lookup table, collects an IP address corresponding to the checked domain name from the DDNS server 300, and updates relevant IP information in the access control list of the lookup tab by use of the collected IP address.

For example, if the access control list of the lookup table stored in the storage unit of the outdoor apparatus 200 stores a plurality of pieces of URL information and a plurality of pieces of IP address information about a plurality of indoor apparatuses, for example, gateways, the outdoor apparatus 200 collects IP addresses of all of the gateways having domain names included in the plurality of pieces of URL information of the gateway stored in the access control list, and updates the access control list by use of the collected IP addresses.

Meanwhile, the outdoor apparatus 200 requested by the gateway 110 for connection may collect an IP address, which corresponds to a domain name of the gateway 110 having requested connection, from the DDNS server 300, and updates an IP address, which corresponds to URL information having the domain name of the gateway 110 having requested connection, in the access control list of the lookup table by use of the collected IP address.

Referring to FIG. 9, the access control list lookup table stores URL information about the gateway 110, which is approved for connection to the outdoor apparatus 200, and changed IP address information may be stored in a chronological order.

For example, the gateway 110 connectable to the outdoor apparatus 200 has a domain name "indoor.com", and "168.203.100.3" and "203.100.80.1" represent IP addresses having been allowed when the gateway 110 has gained access to the outdoor apparatus 200. The respective IP addresses "168.203.100.3" and "203.100.80.1" have been assigned at the booting of the gateway 110. The IP address "203.100.80.1" has been assigned more recently than the IP address "168.203.100.3."

Meanwhile, after the access control list is updated, the outdoor apparatus 200 determines whether an IP address of the gateway 110 having requested the connection is matched to an IP address of the gateway 110 in the access control list of the lookup table. If the outdoor apparatus 200 finds an IP address matched to the IP address of the gateway 110 having requested the connection in the lookup table access control list, the outdoor apparatus 200 approves the connection of the gateway 110. If the outdoor apparatus 200 fails to find an IP address matched to the IP address of the gateway 110 having requested the connection, the outdoor apparatus 200 denies the connection of the gateway 110 (2300).

That is, the gateway 110 using a dynamic IP address knows URL information about the outdoor apparatus 200, which is desired for connection, through the access control list lookup table, and collects IP address information about the outdoor apparatus 200 by performing a domain name query with respect to the DDNS server 300. The gateway 110 attempts to gain access to the HAN 100 by use of the collected IP address information to connect to the outdoor apparatus 200. That is, the gateway 110 transmits a gateway query, including its own identification information, to the DDNS server 300 to receive IP address information about the outdoor apparatus 200, which is desired for connection, from the DDNS server 300.

Thereafter, the gateway 110 makes a request for connection to the outdoor apparatus 200 by use of IP address information about the outdoor apparatus 200.

Meanwhile, the outdoor apparatus 200, having been requested by the gateway 110 for the connection, performs a domain name query with respect to the DDNS server 300 by use of URL information in the access control list to collect IP address information about the gateway 110 having requested the connection. That is, the outdoor apparatus 200 transmits an outdoor query including its identification information to the DDNS server 300 to receive IP address information about the gateway 110, which has requested the connection, from the DDNS server 300, and updates the access control list by use of the received IP information. In the case that a query is generated from the outdoor apparatus 200, and that if the gateway 110 corresponding to the generated query is registered in the database and is in an active state, the DDNS server 300 notifies the outdoor apparatus 200 of the IP address about the gateway 110 registered in the database in response to the query.

Upon notification of the IP address about the gateway 110 having requested the connection from the DDNS server 300, the outdoor apparatus 200 updates the access control list by use of the notified IP address.

After the updating of the access control list, the outdoor apparatus 200 determines whether an IP address corresponding to a domain name of the gateway 110 having requested the connection is matched to an IP address in the access control list. If the corresponding IP address is found, the outdoor apparatus 200 approves the connection of the gateway 110. If the corresponding IP address is not found, the outdoor apparatus 200 denies the connection of the gateway 110.

The network system and control method described above involves communication between, for example, an outdoor apparatus, a DDNS server, a gateway, one or more home appliances, through the Internet and a HAN. Various aspects of the example embodiments described herein may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The network system, control method, and devices described above according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but is not limited to, a software or hardware component, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The disclosure herein has provided example embodiments of a network and control method thereof, which may be applied to communicate with certain devices such as home appliances; however the disclosure is not so limited. It should be noted that a home area network need not be restricted in application to a residential home, but may be utilized in other environments, such as an office, commercial building, a restaurant, etc. In addition, while certain home appliances have been described, the disclosure is not so limited to those specific devices which are provided as examples. Other home appliances may include, but are not limited to, a thermostat, a dryer, a home audio/theater system, dishwasher, disposal, oven, microwave, etc. Moreover, the term 'outdoor apparatus' need not imply necessarily that the outdoor apparatus is physically outdoors or is actually located outside of the home or other environment in which the devices which the outdoor apparatus communicates with. The outdoor or external apparatus may be any apparatus or device that is connectable to the Internet or other like network, and communicates with other devices, such as appliances, remotely via the Internet or other like network, either directly, or through a gateway, for example.

Accordingly, although a few embodiments of the present disclosure have been shown and described, it would be appreciated by those skilled in the art that changes may be made to these embodiments without departing from the principles and spirit of the disclosure, the scope of which is defined by the claims and their equivalents.

What is claimed is:

1. A network system comprising:
a gateway connected to a plurality of appliances through a home area network (HAN) and using a dynamic internet protocol (IP) address;
an external apparatus connectable to the gateway through a network; and
a dynamic domain name system (DDNS) server connected to the external apparatus and the gateway through a network and configured to manage dynamic IP address information about the gateway, and upon a request made by the external apparatus, provides the external apparatus with dynamic IP address information about the gateway, wherein
if the gateway makes a request for connection, the external apparatus requests the DDNS server to provide IP address information about the gateway having requested the connection, receives the requested IP address information and permits or blocks the connection of the gateway depending on whether the received IP address information matches IP address information about the gateway having requested the connection.

2. The network system of claim 1, wherein in order for the gateway to request a connection to the external apparatus, the gateway requests the DDNS server to provide an IP address corresponding to a domain name of the external apparatus, receives the requested IP address and accesses the received IP address, thereby requesting the connection to the external apparatus.

3. The network system of claim 1, wherein the external apparatus stores a lookup table having an access control list that stores uniform resource locator (URL) information about the gateway, which is permitted connection, and IP address information corresponding to the URL information, and the external apparatus receives the IP address information about the gateway having requested the connection and updates the access control list of the lookup table by use of the received IP address information.

4. The network system of claim 3, wherein the access control list stores the URL information about the gateway in a chronological order.

5. The network system of claim 1, wherein the external apparatus and the gateway are registered in the DDNS server, and uniform resource locator (URL) information and IP address information of both the external apparatus and gateway are stored in the DDNS server.

6. The network system of claim 1, wherein the DDNS server receives a changed IP address of the gateway from an internet service provider (ISP) that is connected to the DDNS server through a network, and manages IP address information about the gateway.

7. A control method in a network system comprising a gateway connected to a plurality of appliances through a home area network and using a dynamic internet protocol (IP) address, an external apparatus connectable to the gateway through a network, and a dynamic domain name system (DDNS) server connected to the external apparatus and the gateway through a network and configured to manage dynamic IP address information about the gateway, the control method comprising:
- at the gateway, requesting a connection to the external apparatus;
- at the external apparatus, accessing the DDNS server and requesting the DDNS server to provide IP address information about the gateway having requested the connection;
- at the DDNS server, in response to the request by the external apparatus, providing the external apparatus with IP address information about the gateway having requested the connection;
- at the external apparatus, receiving the requested IP address information about the gateway from the DDSN server;
- at the external apparatus, determining whether the received IP address information matches IP address information about the gateway having requested the connection; and
- at the external apparatus, permitting or blocking the connection of the gateway based on a result of the determination.

8. The control method of claim 7, wherein the requesting for the IP address information about the gateway from the DDNS server comprises:
- at the external apparatus, requesting the DDNS server to provide a dynamic IP address corresponding to a domain name of the gateway having requested the connection.

9. A control method in a network system comprising a gateway connected to a plurality of appliances through a home area network and using a dynamic internet protocol (IP) address, an external apparatus connectable to the gateway through a network, and a dynamic domain name system (DDNS) server connected to the external apparatus and the gateway through a network and configured to manage dynamic IP address information about the gateway, the control method comprising
- if the gateway makes a request for connection to the external apparatus, at the external apparatus, requesting the DDNS server to provide IP address information about the gateway having requested the connection and receiving the requested IP address;
- at the external apparatus, determining whether the received IP address information matches IP address information that is directly received from the gateway having requested the connection; and
- permitting the connection of the gateway if a result of the determination is that the IP address information received from the DDNS server matches the IP address information directly received from the gateway, and blocking the connection of the gateway if a result of the determination is that the IP address information received from the DDNS server does not match the IP address information directly received from the gateway.

10. A control method for an external device using a dynamic internet protocol (IP) address in a network system, the control method comprising:
- receiving a request for a connection from a gateway device;
- requesting IP address information about the gateway device from a dynamic domain name system (DDNS) server, when the gateway device requests the connection;
- receiving the requested IP address from the DDNS server;
- determining whether the received IP address information matches IP address information directly received from the gateway device which requested the connection; and
- permitting the connection to the gateway device if the IP address information received from the DDNS server matches the IP address information directly received from the gateway device, and blocking the connection to the gateway device if the IP address information received from the DDNS server does not match.

\* \* \* \* \*